United States Patent
Nguyen et al.

(10) Patent No.: US 11,409,634 B2
(45) Date of Patent: Aug. 9, 2022

(54) RETROACTIVE TRACING IN A DISTRIBUTED SYSTEM

(71) Applicant: Cisco Technology, Inc., San Jose, CA (US)

(72) Inventors: Khanh V. Nguyen, Milpitas, CA (US); Bojesha Nagaraja, San Jose, CA (US); Aniruddh S. Dikhit, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/684,278

(22) Filed: Nov. 14, 2019

(65) Prior Publication Data

US 2021/0149787 A1 May 20, 2021

(51) Int. Cl.
*G06F 11/36* (2006.01)
*G06F 11/34* (2006.01)
(Continued)

(52) U.S. Cl.
CPC ...... *G06F 11/3636* (2013.01); *G06F 11/0757* (2013.01); *G06F 11/0772* (2013.01);
(Continued)

(58) Field of Classification Search
CPC .......... G06F 11/3466; G06F 11/3476; G06F 11/3485; G06F 11/3495; G06F 11/36;
(Continued)

(56) References Cited

U.S. PATENT DOCUMENTS 6,393,590 B1 * 5/2002 Wood ................ G06F 11/0757
710/104
6,493,837 B1 * 12/2002 Pang ................. G06F 11/3466
707/999.202

(Continued)

OTHER PUBLICATIONS

Ates, Emre, et al., An automated, cross-layer instrumentation framework for diagnosing performance problems in distributed applications, SoCC '19: Proceedings of the ACM Symposium on Cloud Computing, Nov. 2019, pp. 165-170, [retrieved on Jan. 14, 2022], Retrieved from the Internet: <URL:http://dl.acm.org/>.*

(Continued)

*Primary Examiner* — Geoffrey R St Leger
(74) *Attorney, Agent, or Firm* — Patterson + Sheridan, LLP (57) ABSTRACT

Embodiments herein describe a retroactive tracer that retroactively generates traces using data stored in local caches. Rather than continually generating and collecting tracing data in a distributed system (which may requires massive amounts of storage and bandwidth), the embodiments herein store tracing data in local caches corresponding to nodes in the distributed system (e.g., a service, application, virtual machine, server, network device, etc.). When an error is detected when executing a task, the retroactive tracer can broadcast a request that the nodes send any trace data they may have corresponding to that task. The tracer can then retroactively generate the trace from the collected trace data. In contrast, if a task completes without an error, the nodes delete the trace data from their local caches (i.e., the trace data is not collected by the retroactive tracer).

13 Claims, 7 Drawing Sheets

(51) Int. Cl.
    *G06F 11/07*         (2006.01)
    *G06F 11/30*         (2006.01)

(52) U.S. Cl.
    CPC ...... *G06F 11/3006* (2013.01); *G06F 11/3495* (2013.01); *G06F 11/366* (2013.01); *G06F 11/0778* (2013.01); *G06F 11/3476* (2013.01)

(58) Field of Classification Search
    CPC ............... G06F 11/3636; G06F 11/366; G06F 11/3664; G06F 11/0757; G06F 11/0772; G06F 11/0766; G06F 11/3006
    USPC ........................................ 717/127, 128, 130
    See application file for complete search history.

(56) References Cited

U.S. PATENT DOCUMENTS

| | | | | |
|---|---|---|---|---|
| 7,793,261 | B1* | 9/2010 | Edwards | G06F 11/3636 717/124 |
| 7,940,718 | B2* | 5/2011 | Olsson | H04L 43/0817 370/328 |
| 8,127,315 | B2* | 2/2012 | Chessell | G06F 11/3428 719/330 |
| 9,632,907 | B2 | 4/2017 | Strong et al. | |
| 9,875,167 | B1* | 1/2018 | Norrie | G06F 16/489 |
| 9,928,517 | B1* | 3/2018 | Hitchcock | H04L 41/14 |
| 10,558,572 | B2* | 2/2020 | Mola | G06F 11/362 |
| 10,880,191 | B1* | 12/2020 | Kant | G06F 16/951 |
| 2008/0162272 | A1* | 7/2008 | Huang | G06F 11/3409 717/127 |
| 2008/0229336 | A1* | 9/2008 | Chessell | G06F 11/3423 719/330 |
| 2009/0233611 | A1* | 9/2009 | Olsson | H04L 43/0817 455/446 |
| 2016/0224277 | A1* | 8/2016 | Batra | G06F 11/3034 |
| 2019/0220403 | A1* | 7/2019 | Mola | G06F 11/362 |

OTHER PUBLICATIONS

Anderson, Eric, et al., Efficient Tracing and Performance Analysis for Large Distributed Systems, IEEE International Symposium on Modeling, Analysis & Simulation of Computer and Telecommunication Systems, Sep. 2009, 10 pages, [retrieved on Jan. 14, 2022], Retrieved from the Internet: <URL:http://ieeexplore.ieee.org/>.*

Benjamin H. Sigelman, Luiz Andr'e Barroso, Mike Burrows, Pat Stephenson, Manoj Plakal, Donald Beaver, Saul Jaspan, Chandan Shanbhag,"Dapper, a Large-Scale Distributed Systems Tracing Infrastructure," Google Technical Report dapper-2010-1, Apr. 2010, 14 pages.

Yuri Shkuro, "Evolving Distributed Tracing at Uber Engineering," Uber Engineering Blog, Feb. 2, 2017, 15 pages.

Zipkin,"Architecture Overview," [Accessed Online Oct. 17, 2019] https://zipkin.io/pages/architecture.html.

"The OpenTracing Project." The OpenTracing Project, Date Accessed: Feb. 25, 2022, https://opentracing.io/.

* cited by examiner

RETROACTIVE TRACING IN A DISTRIBUTED SYSTEM

TECHNICAL FIELD

Embodiments presented in this disclosure generally relate to retroactively generating traces. More specifically, embodiments disclosed herein describe using local caches to store trace data until a centralized controller determines to retroactively to collect data corresponding to a trace.

BACKGROUND

Tracing the sequence of flows across multiple services or devices is a major challenge in distributed systems. In complex systems, current tracing solutions generate and collect large amounts of trace data so that when an error occurs, the tracing data is available to identify the problem or issue. However, because of these high overhead costs, tracing is usually enabled only for a short time while debugging a specific problem. As a result, full trace data is usually not available when a problem happens unexpectedly or intermittently. The troubleshooter often has the difficult task of reproducing the problem (when tracing is enabled) in order to collect full trace data so the problem can be diagnosed. Because tracing by nature is very chatty, this can introduce challenges such as storing a high volume of data and then later identifying which trace to use for debugging the system.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes identifying a task to be completed by a plurality of nodes in a distributed system where the plurality of nodes configured to store trace data corresponding to the task at local caches in the plurality of nodes. The method also includes detecting an error when executing the task using the plurality of nodes, collecting the trace data stored in the local caches in response to detecting the error, and retroactively generating a trace using the collected trace data.

Another embodiment herein is a distributed system that includes a plurality of nodes that have a plurality of local caches. The plurality of nodes store trace data corresponding to a task performed by the plurality of nodes and detect an error when executing the task. The distributed system also includes a controller communicatively coupled to the plurality of nodes that collects the trace data stored in the local caches in response to the error and retroactively generates a trace using the collected trace data.

Another embodiment herein is non-transitory computer readable medium having program instructions embodied therewith, the program instructions executable by a processor to perform an operation. The operation includes identifying a task to be completed by a plurality of nodes in a distributed system where the plurality of nodes configured to store trace data corresponding to the task at local caches in the plurality of nodes. The operation also includes detecting an error when executing the task using the plurality of nodes, collecting the trace data stored in the local caches in response to detecting the error, and retroactively generating a trace using the collected trace data.

Example Embodiments

Embodiments herein describe a retroactive tracer that retroactively generates traces using data stored in local caches spread across a distributed system. Rather than continually generating and collecting tracing data in a distributed system (which may require large amounts of storage and bandwidth), the embodiments herein store tracing data in local caches (e.g., shadow caches) corresponding to a plurality of nodes in the distributed system (e.g., services, applications, virtual machines, servers, network devices, etc.). When an error is detected when executing a task, the retroactive tracer can broadcast a request that the nodes send any trace data they may have corresponding to that task. These requests can be sent over a channel so that all systems that have trace data corresponding to the event, transmit a specific section of their cache corresponding the failed operation to a system (e.g., the tracer) that records the trace for later inspection. The tracer can then retroactively generate the trace from the collected trace data. In contrast, if a task completes without an error, the nodes eventually delete the trace data from their local caches (i.e., the trace data is not collected by the retroactive tracer). For example, each local cache may use a timer to determine when to delete the trace data, which may be after the task has completed. In this manner, the retroactive tracer generates a trace for the tasks that generate an error, which is done retroactively—i.e., after the task fails to complete. Doing so avoids having to constantly collect trace data at a centralized controller and also provides trace data for any errors that occurred in the distributed system so that a system administrator does not need to reproduce the problem in order to generate a trace.

Figure 1:
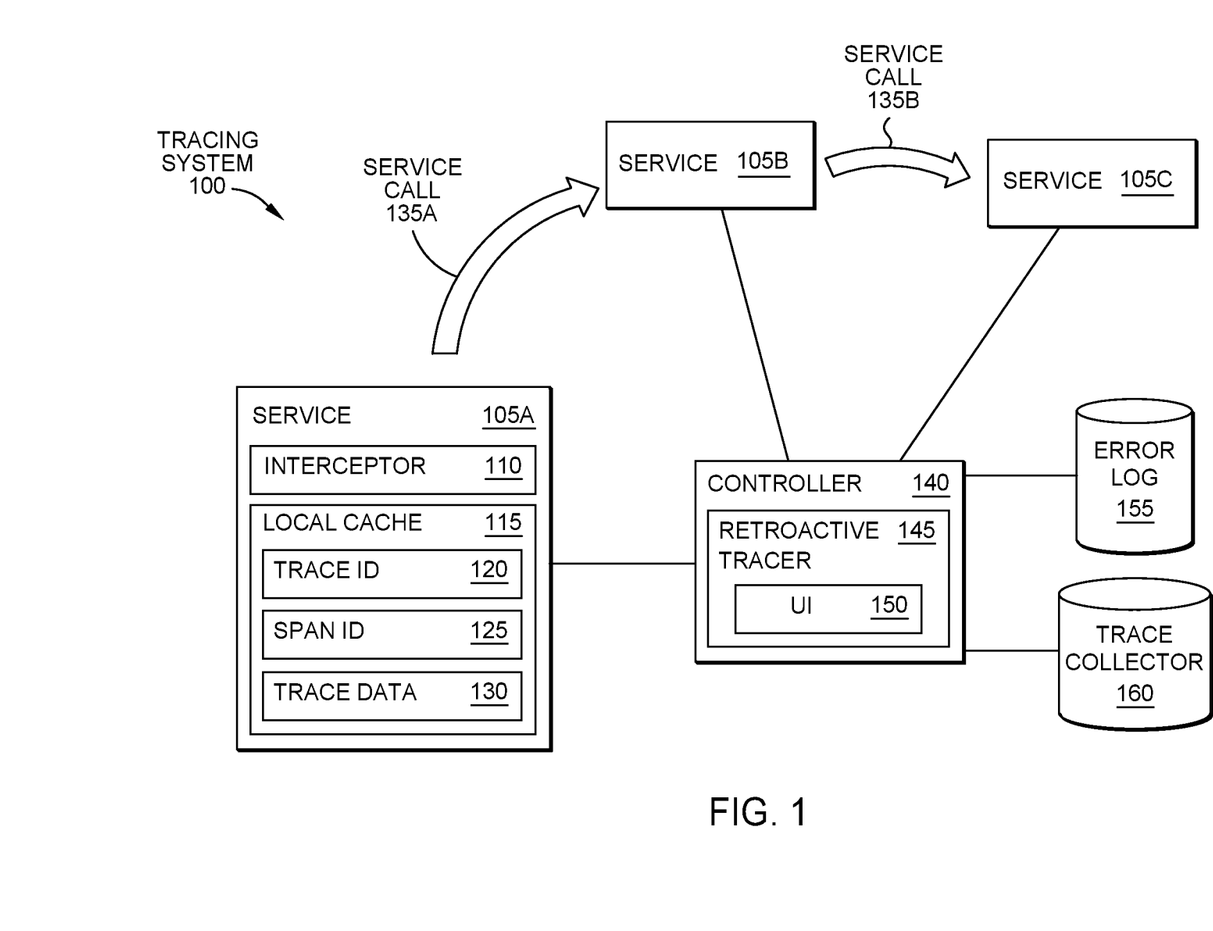
FIG. 1 illustrates a tracing system for retroactively generating traces using local caches, according to one embodiment.

FIG. 1 illustrates a tracing system 100 for retroactively generating traces using local caches 115, according to one embodiment. The system 100 (e.g., one example of a distributed system) includes a plurality of services 105 (e.g., a plurality of nodes) that are communicatively coupled to a controller 140 which executes a retroactive tracer 145 (e.g., a software application). In one embodiment, the controller 140 is a centralized controller that permits a system administrator to provision and configure network devices. The services 105 (e.g., micro-services) may perform services corresponding to the controller 140 such as discovering devices in a network, assigning network devices to a site/location group, or removing network devices. In general, these services are referred to as tasks. For example, a customer may submit a task to the controller which requires each of the services 105A-C to perform one or more functions. For example, the service 105A may perform a first function of the task and then make a service call 135A to the service 105B to perform a second function of the task. Once complete, the service 105B makes a service call 135B to the service 105C which performs a third function of the task. In one embodiment, the function (or operation) performed by each of the services 105 when performing the task is referred to as a span. Further, the spans may be organized in a hierarchy of parent and children spans. For example, since the service 105A called the service 105B, the span of the service 105A is a parent to the span of the service 105B (i.e., a child span or child node). Moreover, since the service 105B called the service 105C, the span of the service 105B is a parent span (or parent node) to the span of the service 105C. As such, the span of the service 105B is a child span/node of the service 105A but a parent span/node of the service 105C.

As shown by the service 105A, each of the services 105 includes an interceptor 110 and a local cache 115. The interceptor 110 is a software application that manages and creates the tracing information that is stored in the local cache 115—e.g., a trace ID 120, span ID 125, and trace data 130. The local caches 115 can be volatile memory (e.g., RAM) or non-volatile memory (e.g., a hard disk). Further, although the services 105 are shown as being separate, multiple services 105 can be executed on the same hardware system—e.g., the same server or virtual machine. In one example, the services 105 can execute on the same hardware system that hosts the controller 140. However, in other embodiments, the services 105 and the controller 140 may be executed on different computing systems.

In one embodiment, the interceptor 110 monitors received tasks or service calls and determines whether to generate tracing information for that task or call. The interceptor 110 can also detect errors in the children spans. For example, if the service 105C threw an exception (e.g., an error) when executing the service call 135B, this is detected by the interceptor 110 in the service 105B and can report this error to the controller 140.

In one embodiment, the trace ID 120 is a global ID that uniquely identifies a trace for a task. That is, a task may have a single, unique trace ID assigned to it when executing in the tracing system 100. In this example, because the service 105A is the first service performed when executing the task, its interceptor 110 may generate the trace ID 120 for the task. When performing the service calls 135A-B, the services 105 can pass the trace ID 120 to each other so that the same trace ID 120 is stored in all the services 105 that execute functions (or spans) of that task.

The span ID 125 may be used to identify the particular function performed by the service 105. Thus, each service 105 has a different value for its span ID 125 stored in its local cache 115. Moreover, each span ID 125 can be passed down to the next service so that the hierarchy of spans can be created. That is, the service 105A passes its span ID 125 to the service 105B as part of the service call 135A. In turn, the service 105B passes its span ID 125 and the span ID 125 for the service 105A to the service 105C. In this manner, the parent-child relationships of the spans can be stored in the local caches 115.

The trace data 130 can include any data helpful for performing debugging when an error occurs when performing the task. For example, the trace data 130 can include input/output data values when executing the function or span in the service 105, service ID, operation name, operation parameters and returned values. The trace data 130 can also include context about the service 105 such as its physical location (site or building location) or IP address. This is referred to as building up of the trace-context and helps to stitch together higher order logic. For example a call started under an operation (which calls multiple services) can call another operation (which also calls multiple services) and the system keeps passing this trace-context to the services to stitch the complete trace.

As described in more detail below, the local caches 115 store the trace information—e.g., the trace ID 120, span ID 125, and trace data 130—for a limited time. Preferably, this time is sufficient to allow the task to complete. If there were no errors when performing the task, the tracing information stored in each local cache 115 of the services 105 is deleted. However, if there was an error, this error is reported to a retroactive tracer 145 which then receives the trace information from the services 105 that executed functions of the task. Using this information, the retroactive tracer 145 can retroactively generate a trace for the task and store that trace in a trace collector 160. Thus, in one embodiment, the retroactive tracer 145 generates a retroactive trace only for the tasks that experience an error when being executed in the system 100 which saves system resources.

In addition to storing the trace information, the error that caused the retroactive tracer 145 to generate the trace can be stored in an error log 155. The error may be associated with the trace ID 120 of the trace that experienced the error. If multiple tasks experience the same error, the error log 155 can store the trace IDs for those task in a same entry as the error. Thus, when a customer experiences a particular error, she can use the error log 155 to identify all the traces that experienced that error. Using the trace IDs, the retroactive tracer can pull the traces from the trace collector 160 and display those traces in a user interface (UI) 150. The UI 150 can then be used to perform debugging.

Figure 2:
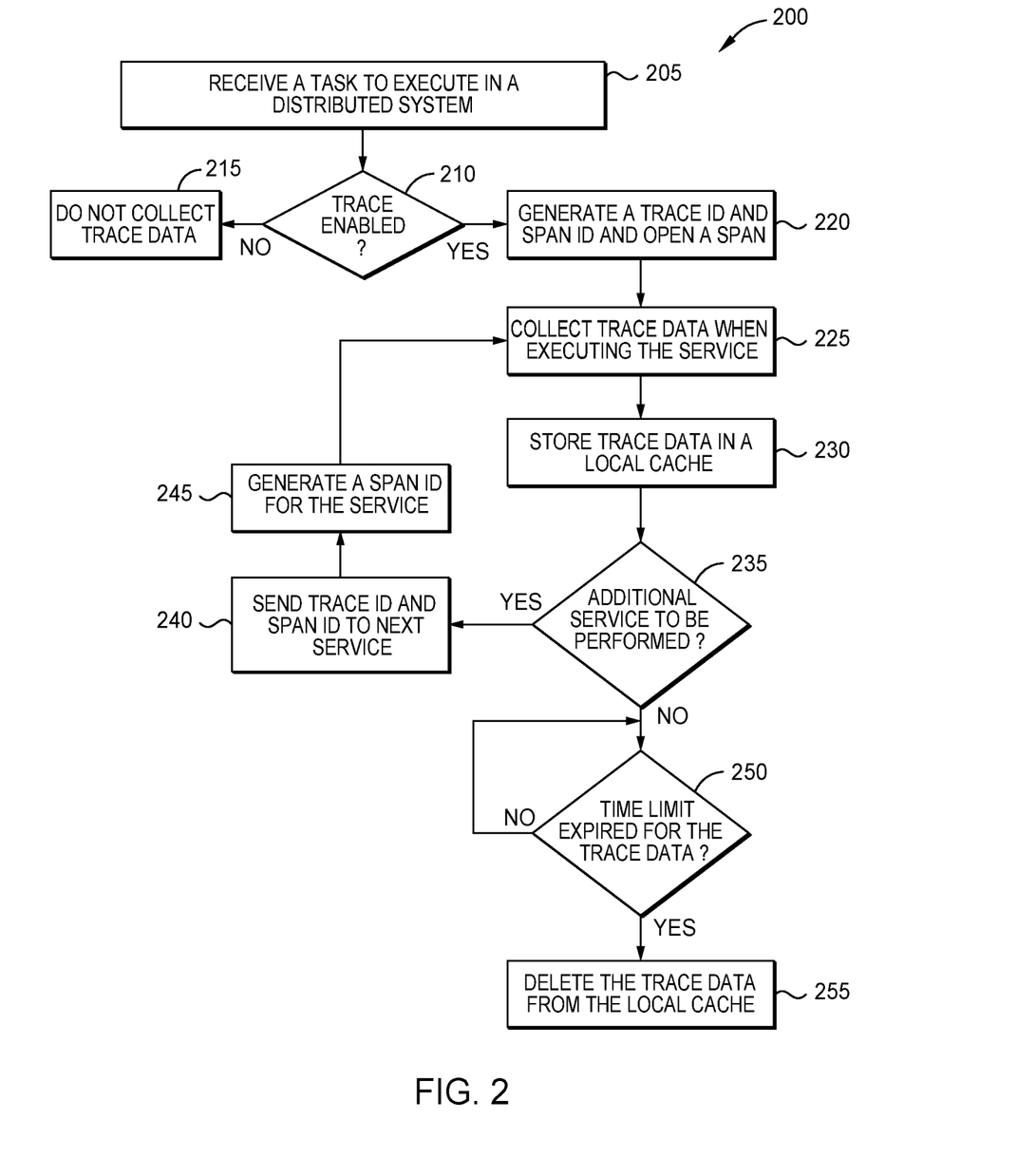
FIG. 2 is a flowchart for storing tracing data in a local cache, according to one embodiment.

FIG. 2 is a flowchart of a method 200 for storing tracing data in a local cache, according to one embodiment. At block 205, an interceptor receives a task to execute in a distributed system. While the method 200 is described using the distributed system illustrated in FIG. 1 as an example, the method 200 can be used in other types of distributed systems such as the ones illustrated in FIGS. 6 and 7 below.

In one embodiment, the task requires multiple services to perform respective functions/operations/spans. The trace for that task represents an end-to-end workflow and includes multiple spans, each of which represent a function/operation performed by a service. A span can have one or more child spans and is tagged (e.g., identified) using a span ID. For example, a trace can start with a root span (which represents the function performed by the first service) that launches additional child span(s) to execute sub-operations of the task such as querying a database service, processing query data, and constructing responses.

At block 210, the interceptor determines whether tracing is enabled for the task. For example, a system administrator may want to use method 200 only on certain tasks (e.g., tasks that require multiple services, or high priority tasks). Or method 200 may only be used when a distributed system is first being activated or after a software or hardware update. However, because the trace information can be collected at the central controller only when an error occurs which reduces the impact on bandwidth and storage, the method 200 may be used for all tasks at all times rather than only for certain tasks or during certain times.

If tracing is not enabled, the method 200 proceeds to block 215 where the service does not collect trace data for the task and method 200 ends. However, if tracing is enabled, the method 200 proceeds to block 215 where the interceptor generates a trace ID for the trace and a span ID to represent the function performed by the current service. The interceptor also opens a span for collecting the trace data associated with performing a function of the task on the service—i.e., the trace data 130 in FIG. 1.

At block 225, the interceptor collects trace data when executing the service for the task. That is, the interceptor collects any data that may be useful when performing debugging (e.g., input/output data values, operation name, operation parameters and returned values, physical location, IP address, etc.).

At block 230, the interceptor stores the trace data in a local cache of the service. As mentioned above, the local cache is a temporary repository for the trace data since the data is either collected by a central controller (e.g., the retroactive tracer, or more generally, the controller 140) or simply discarded. Thus, the size of the local cache can be small since it may store trace data for only a handful of traces at any given time.

At block 235, the current service determines whether an additional service should be performed. For example, the task may require performing several different services, in which case, the first service makes a service call to the next service (or services). If there are additional services, the method 200 proceeds to block 240 where the current service sends the trace ID for the task and the span ID for the current service to the next service.

At block 245, the next service generates a span ID for its function. The service can also store an indication that its span ID is a child of the span ID of the previous service. In this manner, the trace can include a hierarchy of span IDs where each service stores an indication of its parent span.

The method 200 then repeats block 225 and 230 and returns to block 235. If more services are required, the method 200 can continue to repeat blocks 240, 245, 225, and 230. However, if the service is the last service, the method proceeds to block 250 where the local caches determine whether the time limit for the trace data has expired. In one embodiment, the services have a predefined timer for each service it performs (and the corresponding trace data that was generated). When a timer expires, at block 255, the local cache deletes the corresponding trace data. As described later, if there was an error with a particular task, the retroactive tracer can request the trace data corresponding to that task from the local caches, which occurs before the timers for that data has expired. That is, the timer can be set such that the retroactive tracer has time to collect the trace data in response to an error before the local caches delete the data. In another embodiment, rather than relying on timers, the distributed system can send explicit messages to the services to instruct them to delete the trace data from their local caches, e.g., after the task completes successfully.

Figure 3:
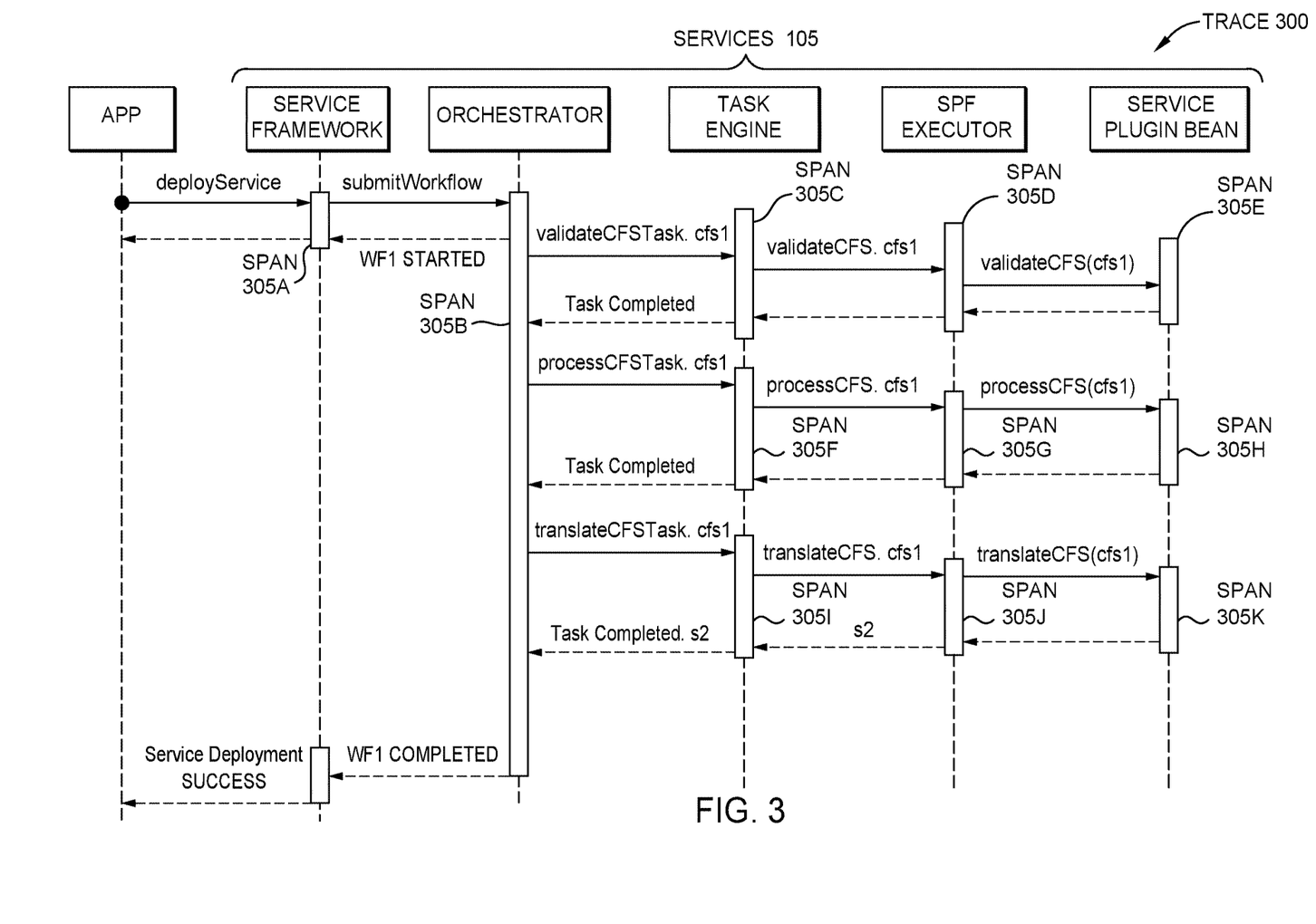
FIG. 3 illustrates a trace containing multiple spans between services, according to one embodiment.

FIG. 3 illustrates a trace 300 containing multiple spans 305 between services 105, according to one embodiment. As shown, the trace 300 includes functions that were performed by multiple services 105—i.e., a Service Framework, Orchestrator, Task Engine, SPF Executor, and Service Plugin Bean. The trace 300 (and task) begins when an App (e.g., a customer application) submits an application programming interface (API) call ("deployService") to the first service—i.e., the Service Framework. In response, the Service Framework generates a span 305A which collects the trace data described above. The Service Framework may also generate a trace ID (assuming one was not provided) and a span ID for the span 305A.

The Service Framework then generates a service call to the Orchestrator ("submitWorkflow") which generates another span 305B which is a child of the span 305A. The span 305B then results in other service calls to the Task Engine, SPF Executor, and Service Plugin Bean which generate their respective spans 305C, 305D, and 305E. Once those service calls are complete, the span 305B then calls these same services two additional times resulting in spans 305F-305K. These spans 305F-305K are also sub-spans (or children) of span 305B.

As discussed above in the method 200, this hierarchy of spans 305 can be stored within the trace data at the local caches of the services 105. Eventually, the spans complete and the task—i.e., the service deployment—is returned to the App with an indication that the task succeeded.

Figure 4:
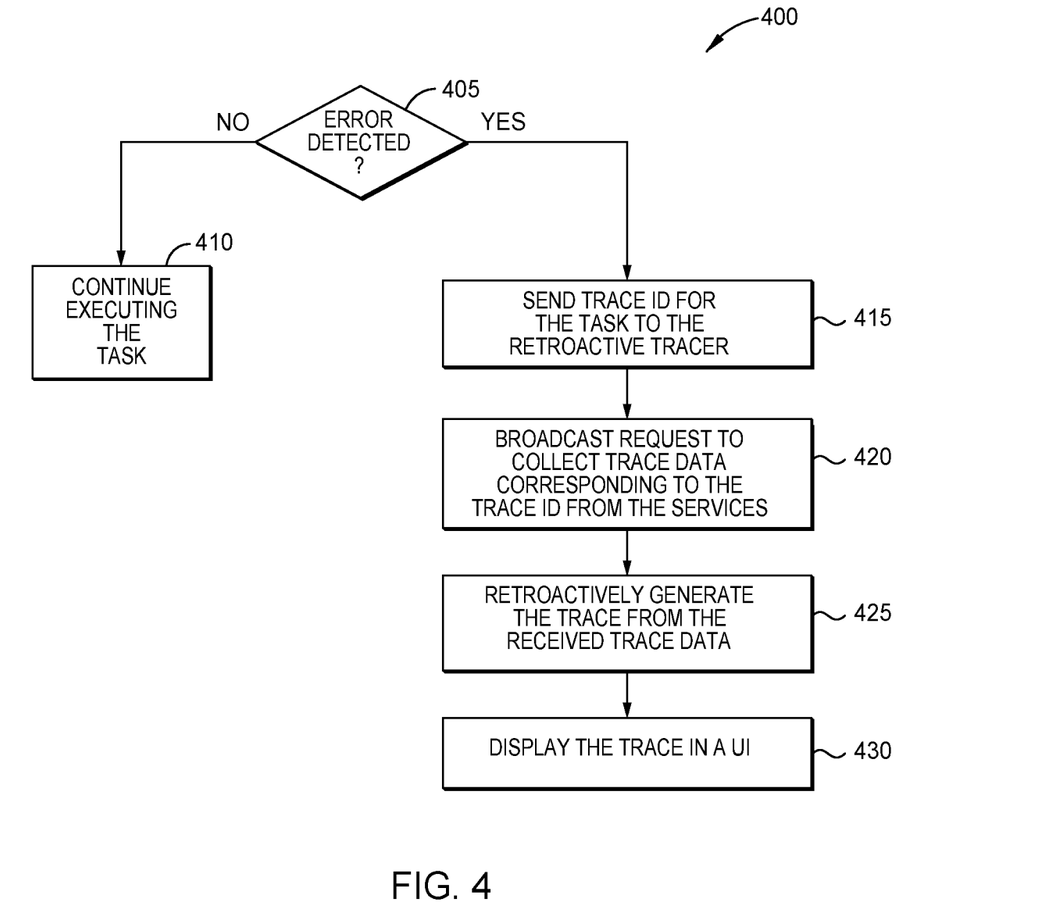
FIG. 4 is a flowchart for retroactively generating traces, according to one embodiment.

FIG. 4 is a flowchart of a method 400 for retroactively generating traces, according to one embodiment. In one embodiment, the method 400 can be performed in parallel with the method 200 in FIG. 2. That is, while the distributed system generates tracing information, the system can also perform the method 400 to determine when to collect the tracing information at a central location (e.g., the retroactive tracer or central controller) to generate a trace for a particular task.

At block 405, an interceptor in a service determines whether a child span has encountered an error. As mentioned above, a task may require multiple services. When a first service sends a service call to a second service, the interceptor in the first service receives a notification from the second service if it encounters an error when executing its function (or span). That is, if an exception is thrown in the second service (e.g., the child span), the second service informs the first service that an error has occurred.

If no error occurs, at block 410, the distributed system can continue to execute the task by, for example, continuing to call additional services. However, if an error is detected, the method 400 proceeds to block 415 where the service detecting the errors sends a trace ID for the task to the retroactive tracer.

At block 420, the retroactive tracer broadcasts a request to collect trace data corresponding to the trace ID from the services. In one embodiment, the retroactive tracer uses a predetermined communication channel to broadcast the request to all the services. When receiving the request, the services search their local caches to determine whether they have trace data corresponding to the received trace ID. If so, the services transmit the trace data to the retroactive tracer. In this manner, the retroactive tracer can collect the trace data for a particular trace from the services. As mentioned above, this is done in response to an error being detected. After the trace data is collected at the retroactive tracer, the services can then delete the trace data from their local caches.

At block 425, the retroactive tracer retroactively generates the trace from the received trace data. Using timestamps and the hierarchy of spans, the retroactive tracer can construct the trace for the task experiencing the error. For example, using the information received from the services, the retroactive tracer can construct a trace similar to the trace 300 illustrated in FIG. 3 which illustrates the service calls between the services, the span hierarchy, as well as when the error occurred (which is not shown in FIG. 3). This is done retroactively, i.e., after the task has failed due to the error.

While blocks 420 and 425 recite using a central component (e.g., the retroactive tracer in the central controller) to collect the trace data at a central location, in another embodiment, each of the services can have their own retroactive tracer element which collects the trace data. In that case, when a service detects an error, its retroactive tracer extracts the parent service span ID stack from the current span context. Back propagation is then performed where the retroactive tracer informs the retroactive tracer in the parent span/service that there was an error. When a retroactive tracer of the parent service receives a notification from the child service, it reports all the trace data records with the given trace ID to a central repository (e.g., the trace collector 160 in FIG. 1). The parent service then forwards the notification with the same trace ID to all services in its child service list, except the child from which the notification was received, and its parent service. This is repeated until all services involved in the failed operation are notified and provide the trace data records corresponding to the trace ID to the central repository. In this manner, the retroactive tracer can be distributed among the services and use back propagation to identify the trace data and forward it to a central repository.

At block 430, the retroactive tracer displays the trace in a UI. Doing so enables a system administrator to perform debugging. For example, after detecting an error in the distributed system, the system administrator can use the error log 155 in FIG. 1 to identify a trace (or task) that experienced that error. The system administrator can then index into the trace collector 160 using a trace ID corresponding to the trace. The information in the trace collector 160 can be used to generate a UI for the system administrator so she can visualize the trace and identify the cause of the error.

Figure 5:
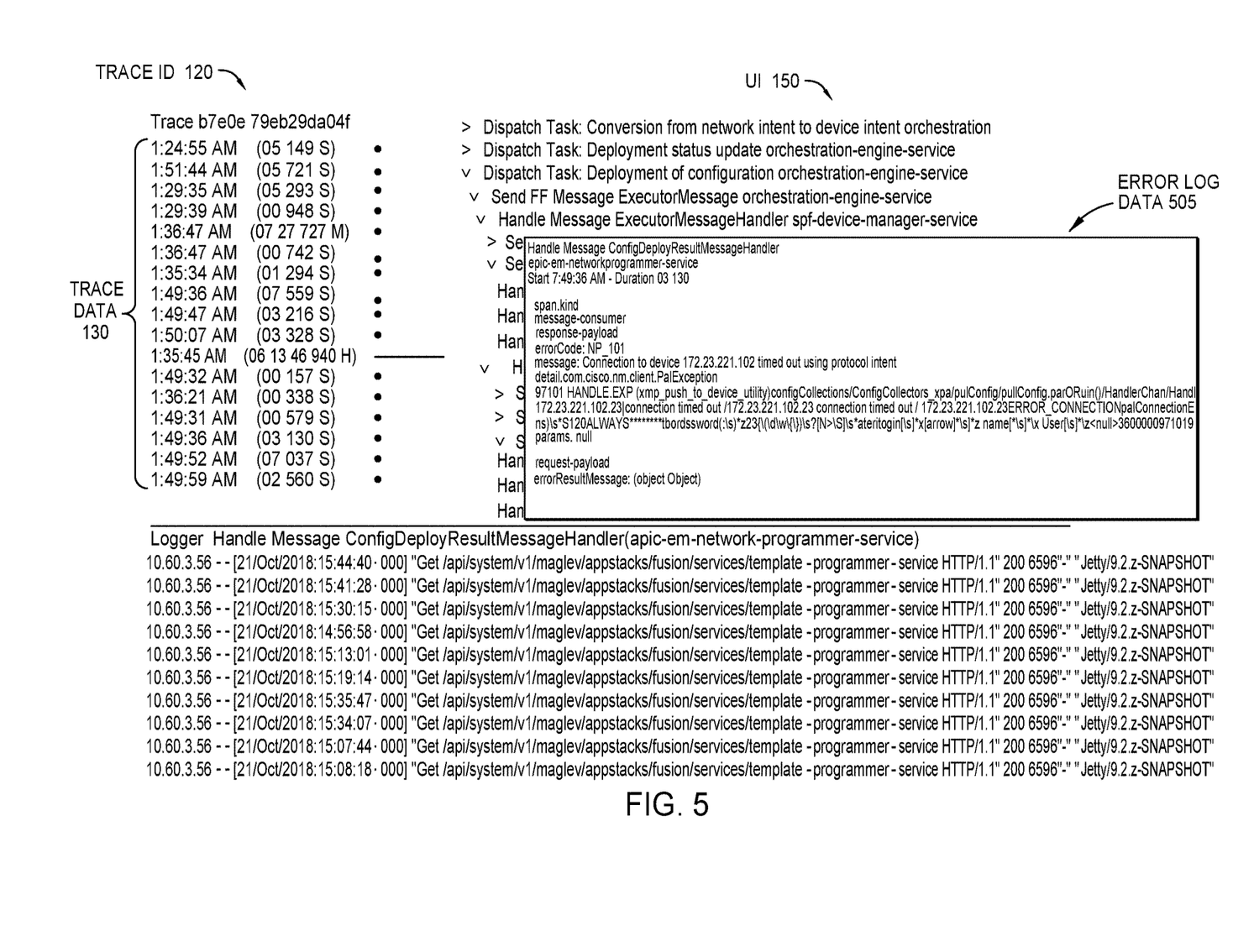
FIG. 5 is a user interface for displaying trace and error log data, according to one embodiment.

FIG. 5 is a UI 150 for displaying trace and error log data, according to one embodiment. The UI 150 includes the trace ID 120, trace data 130, and error log data 505. The trace ID 120 uniquely identifies the trace from other traces captured by the retroactive tracer. The trace data 130, in this example, includes timestamps, duration times, span information, and descriptions of the functions being performed.

The UI 150 also correlates the trace data 130 with the error log data 505. For example, for each span in the trace, the services can collect trace data 130 that includes container/pod ID, process ID of the current process, thread ID of the current thread, and start and end times of the operation. When an error occurs, this trace data (along with the other types discussed above) is transmitted to the retroactive tracer. When a system administrator wants to review the trace, the retroactive trace fetches the spans of the trace from the trace collector 160 in FIG. 1. Starting from the span that the error originated from, the retroactive trace can traverse the parent spans in the hierarchy. For each span in the traversal path, the tracer may use the service's container ID and process ID to locate the service log file. Thread ID and start and end times can be used to filter the service log file to extract the errors, exceptions, and log events associated with a given span. This process can repeat until the root span in the tree is reached—e.g., the first service called when beginning to execute the task.

The retroactive tracer can concatenate all errors, exceptions, and log events to build an end-to-end composite inter-service event log. This log can be placed in the UI 150 to allow a system administrator to cross-reference between the trace data 130 and the error log data 505. In one embodiment, the error log data 505 includes correlated logs across micro-services in the distributed system. This log may only be for the duration of span (a span has a start/end times so logs are captured only during the duration of the span to make this a very precise capture).

Figure 6:
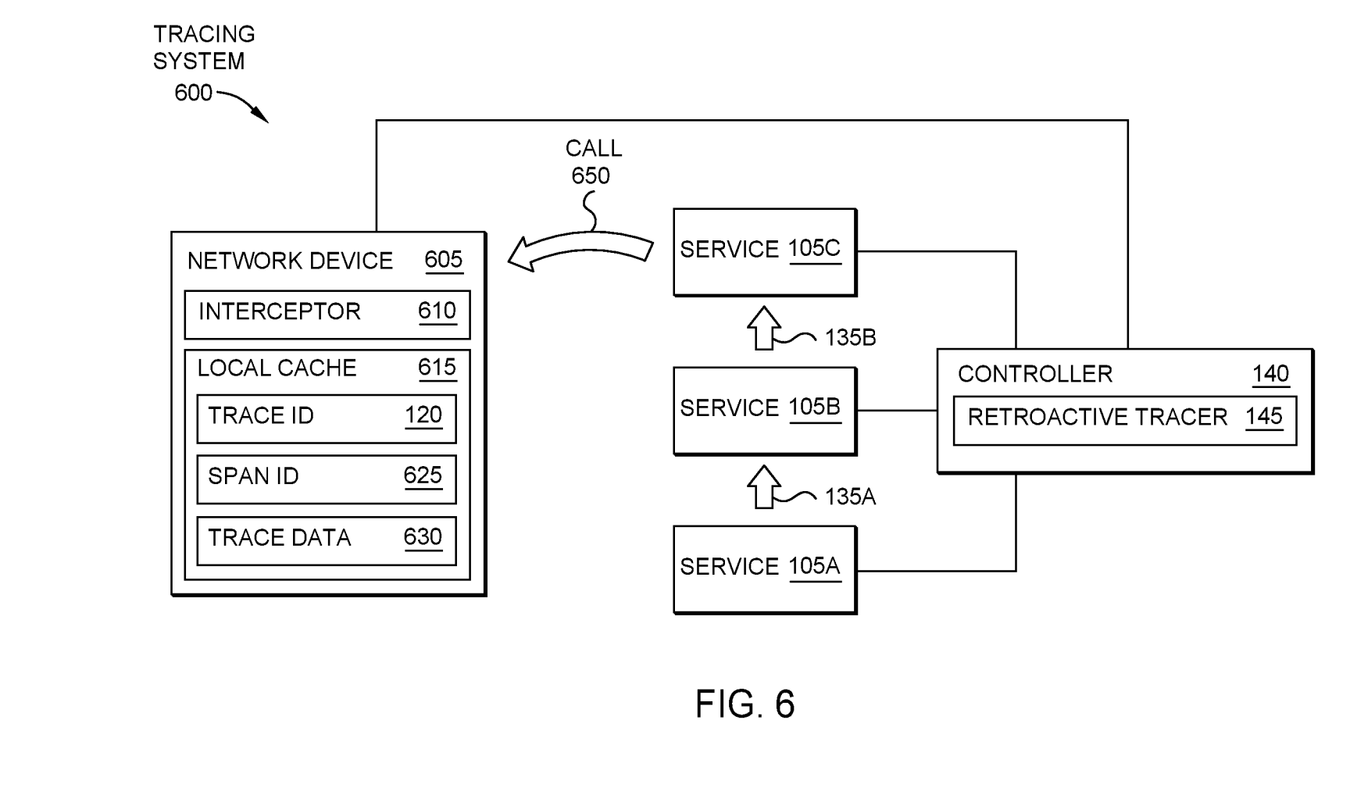
FIGS. 6-7 illustrate tracing systems for retroactively generating traces using local caches, according to one embodiment.
Figure 7:
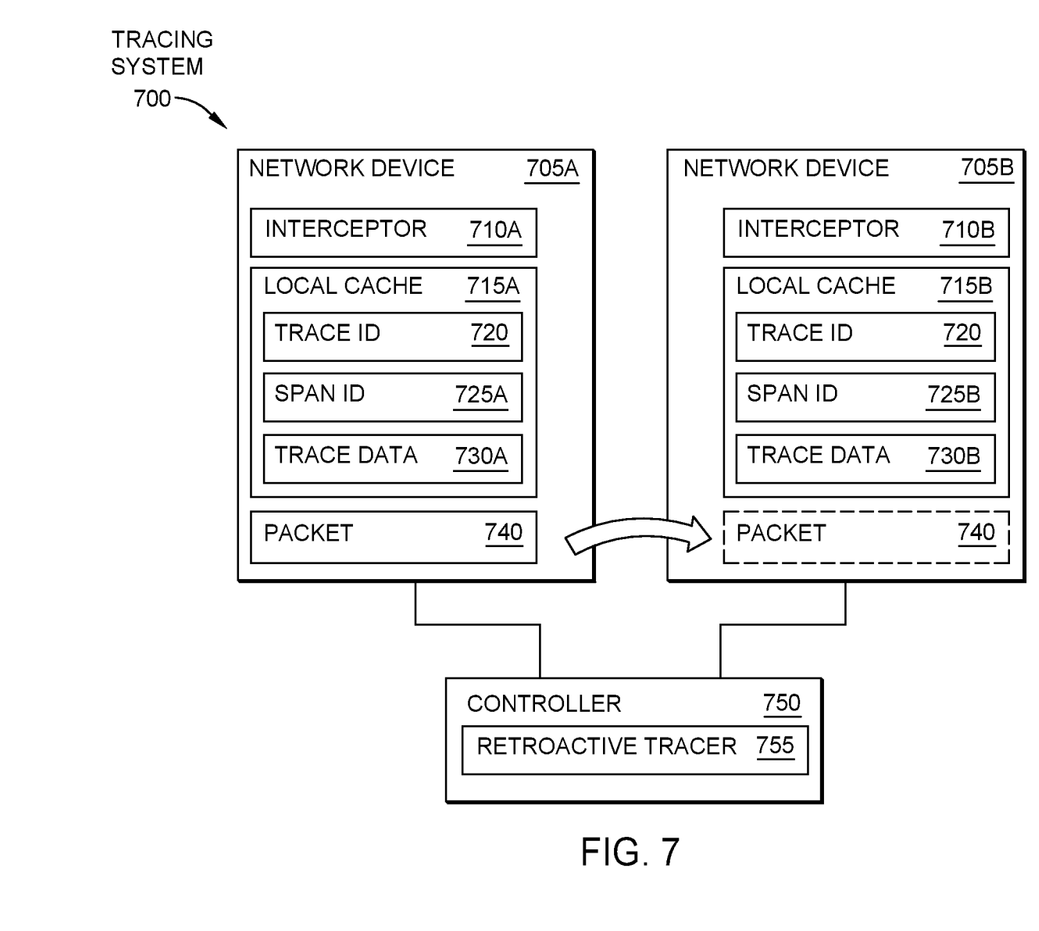

FIGS. 6-7 illustrate tracing systems for retroactively generating traces using local caches, according to one embodiment. FIG. 6 illustrates a distributed tracing system 600 that is similar to the tracing system 100 illustrated in FIG. 1. However, the system 600 includes a network device 605 that is part of the task being executed by the services 105. That is, like in FIG. 1, the services 105 pass service calls 135 between them to perform functions of the task. In addition, the service 105C initiates a call 650 to the network device 605 as part of the task. Thus, the system 600 has a plurality of nodes that includes both the services 105 and the network device 605 to perform the task.

The network device 605 (e.g., a switch, router, or the like) includes an interceptor 610 and a local cache 615 which stores the trace ID 120, a span ID 625, and trace data 630. In one embodiment, the interceptor 610 in the network device 605 performs similar functions as the interceptors in the services 105 (not shown). The interceptor 610 can receive the span IDs for the services 105 and generate its own span ID 625 which is a child of the span of the service 105C. The interceptor can also collect trace data 630 when executing its part of the task. The techniques described in method 400 in FIG. 4 can then be used to collect the trace data 630 if an error occurs when executing the task. Moreover, the local cache 615 can delete the trace ID 120, span ID 625, and trace data 630 according to a timer.

Although not shown, the network device 605 can also make a call to a service or to another network device as part of the task. That is, the network device 605 could make a call to another service 105 which continues to collect trace data and generate another span in the trace for the task. Thus, the trace for the task can include multiple services and multiple network devices. Further, the trace could also extend to other types of devices besides network devices 605. For example, the task may require a customer application executing in a data center to perform one or more functions. The data center could include an interceptor and a local cache for collecting the trace information.

FIG. 7 illustrates a distributed tracing system 700 that includes a plurality of network devices 705 that perform packet forwarding. For example, the network devices 705 (e.g., a plurality of nodes) may be switches or routers that share packets. While network devices 705 are shown, the system 700 may also include endpoint devices which are the source or destination of the packets. These endpoint devices may be servers or consumer devices (e.g., laptops, smartphones, etc.). These endpoint devices may also be part of the tracing system 700 for collecting trace data related to packet forwarding.

In FIG. 7, the tracing system 700 collects tracing information as a packet 740 is routed through the system 700. Thus, while in FIGS. 1 and 6 the tracing information was related to tasks that manage and configure a network, in FIG. 7, the task is packet routing. Thus, the embodiments herein are not limited to a particular task, but can extend to any task that is performed in a distributed system where collecting trace data can be beneficial.

As shown, the network devices 705A and 705B have respective interceptors 710 and local caches 715. These components function similar to the components discussed above. For example, assuming the network device 705A is the first to receive the packet 740, the interceptor 710A generates a trace ID 720 for the trace corresponding to the packet 740. This trace ID 720 is unique and represents the entire trace of the packet 740—e.g., the stops or hops the packet 740 uses to traverse the system 700. The interceptor 710A also generates a span ID 725A to represent the function performed by the network device 705A—e.g., how it decides to forward the packet 740. The trace data 730A can include the arrival time and departure time of the packet 740, a destination/source associated with the packet 740, any data that was added or deleted from the packet 740 by the network device 705A, and the like. In general, the trace data 730A can include any data a system administrator would find useful when debugging the system 700.

The interceptor 710B in the network device 705B can generate its own span ID 725B and trace data 730B when it receives the packet 740. However, the interceptor 710B stores the same trace ID 720 as the trace ID 720 in the network device 705A which is the global ID for the trace corresponding to the packet 740. Like above, the local caches 715 can use a timer to determine when to delete the trace information stored in the local caches 715 for the packet 740. In this manner, the local caches 715 can be small and have minimal impact on the available storage space in the network devices 705 for performing their typical operations.

The system 700 also includes a controller 750 (e.g., a software defined network (SDN) controller) that includes a retroactive tracer 755. The tracer 755 can perform similar functions as that described in the method 400 where, in response to a network device 705 encountering an error when forwarding the packet 740 (e.g., a dropped packet, a disconnected communication path, or unavailable network device), the tracer 755 collects the trace information from the local caches 715 in the network devices 705. That is, when a network device 705 encounters an error when forwarding the packet 740, the network device 705 informs the retroactive tracer 755 which can use the method 400 to transmit a request to the network devices 705 in the system to provide any tracing data that may have in their local caches 715 corresponding to the trace ID 720. The tracer 755 can then retroactively generate a packet trace which can then be displayed in a UI to a system administrator for debugging purposes.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    identifying a task to be completed by a plurality of nodes in a distributed system, wherein each of the plurality of nodes is configured to (i) execute a respective service to perform the task and (ii) store, at a respective local cache, trace data corresponding to the task, wherein, for each of the plurality of nodes, the respective trace data corresponds to a respective timer that defines a respective time limit;
    generating span IDs at the plurality of nodes when performing the task;
    identifying parent-child relationships between spans corresponding to the plurality of nodes;
    detecting an error when executing the task using the plurality of nodes;
    receiving, after detecting the error, a trace ID at a central controller of the distributed system, wherein the trace ID is for a trace corresponding to the task;
    broadcasting a request from the central controller to each of the plurality of nodes using a predetermined communication channel, wherein the request includes the trace ID and requests the trace data stored in the local caches;
    collecting, before expiration of the respective timers of the plurality of nodes, the trace data stored in the local caches in response to broadcasting the request;
    retroactively generating, based on timestamps and the parent-child relationships between spans, a trace using the collected trace data; and
    deleting the trace data from the local caches responsive to expiration of the respective timers of the plurality of nodes.

2. The method of claim 1, further comprising:
    identifying a second task to be completed by the plurality of nodes;
    storing second trace data corresponding to the second task at the local caches;
    performing the second task without detecting an error; and
    deleting the second trace data from the local caches without collecting the second trace data and without generating a second trace for the second task.

3. The method of claim 1,
    wherein the trace ID is a global ID for the trace corresponding to the task.

4. The method of claim 1, further comprising:
    performing, in response to detecting the error, back propagation using the span IDs to inform parent nodes of the plurality of nodes to transmit the trace data to a central controller.

5. The method of claim 1, wherein the plurality of nodes comprises at least one network device.

6. The method of claim 5, wherein the task comprises tracing a packet through the plurality of nodes.

7. A distributed system, comprising:
    a plurality of nodes implemented using one or more computer processors, the plurality of nodes comprising a plurality of local caches, the plurality of nodes is configured to:
        execute a respective service to perform a task;
        store trace data corresponding to the task performed by the plurality of nodes, wherein, for each of the plurality of nodes, the respective trace data corresponds to a respective timer that defines a respective time limit;
        generate span IDs when performing the task;
        identify parent-child relationships between spans corresponding to the plurality of nodes;
        detect an error when executing the task; and
        delete the trace data from the local caches responsive to expiration of the respective timers of the plurality of nodes; and
    a controller implemented using one or more computer processors and communicatively coupled to the plurality of nodes, wherein the controller is configured to:
        receive, after the error is detected, a trace ID from one of the plurality of nodes, wherein the trace ID is for a trace corresponding to the task;
        broadcast a request to each of the plurality of nodes using a predetermined communication channel, wherein the request includes the trace ID and requests the trace data stored in the local caches;
        collect, before expiration of the respective timers of the plurality of nodes, the trace data stored in the local caches in response to broadcasting the request; and
        retroactively generate, based on timestamps and the parent-child relationships between spans, a trace using the collected trace data.

8. The distributed system of claim 7,
    wherein the trace ID is a global ID for the trace corresponding to the task.

9. The distributed system of claim 7, wherein the plurality of nodes is configured to:
    perform, in response to detecting the error, back propagation using the span IDs to inform parent nodes of the plurality of nodes to transmit the trace data to the controller.

10. A non-transitory computer readable medium having program instructions embodied therewith, the program instructions executable by a processor to perform an operation comprising:
    identifying a task to be completed by a plurality of nodes in a distributed system, wherein each of the plurality of nodes is configured to (i) execute a respective service to perform the task and (ii) store, at a respective local cache, trace data corresponding to the task, wherein, for each of the plurality of nodes, the respective trace data corresponds to a respective timer that defines a respective time limit;
generating span IDs at the plurality of nodes when performing the task;
identifying parent-child relationships between spans corresponding to the plurality of nodes;
detecting an error when executing the task using the plurality of nodes;
receiving, after detecting the error, a trace ID for a trace corresponding to the task;
broadcasting a request to each of the plurality of nodes using a predetermined communication channel, wherein the request includes the trace ID and requests the trace data stored in the local caches;
collecting, before expiration of the respective timers of the plurality of nodes, the trace data stored in the local caches in response to broadcasting the request;
retroactively generating, based on timestamps and the parent-child relationships between spans, a trace using the collected trace data; and
deleting the trace data from the local caches responsive to expiration of the respective timers of the plurality of nodes.

11. The non-transitory computer readable medium of claim 10, wherein the operation further comprises:
identifying a second task to be completed by the plurality of nodes;
storing second trace data corresponding to the second task at the local caches;
performing the second task without detecting an error; and
deleting the second trace data from the local caches without collecting the second trace data and without generating a second trace for the second task.

12. The non-transitory computer readable medium of claim 10,
wherein the trace ID is a global ID for the trace corresponding to the task.

13. The non-transitory computer readable medium of claim 7, wherein the operation further comprises:
performing, in response to detecting the error, back propagation using the span IDs to inform parent nodes of the plurality of nodes to transmit the trace data to a central controller.

* * * * *

UNITED STATES PATENT AND TRADEMARK OFFICE
CERTIFICATE OF CORRECTION

| | |
|---|---|
| PATENT NO. | : 11,409,634 B2 |
| APPLICATION NO. | : 16/684278 |
| DATED | : August 9, 2022 |
| INVENTOR(S) | : Khanh V. Nguyen et al. |

It is certified that error appears in the above-identified patent and that said Letters Patent is hereby corrected as shown below:

In the Specification

In Column 3, Line 48, delete "1058" and insert -- 105B --.

In the Claims

In Column 14, Line 18, in Claim 13, delete "claim 7," and insert -- claim 10, --.

Signed and Sealed this
Twenty-fifth Day of October, 2022

Katherine Kelly Vidal
*Director of the United States Patent and Trademark Office*